Oct. 16, 1951 D. CUTRERA 2,571,544
METHOD OF PREPARING BONED TURKEY
Filed Dec. 27, 1949 2 SHEETS—SHEET 1
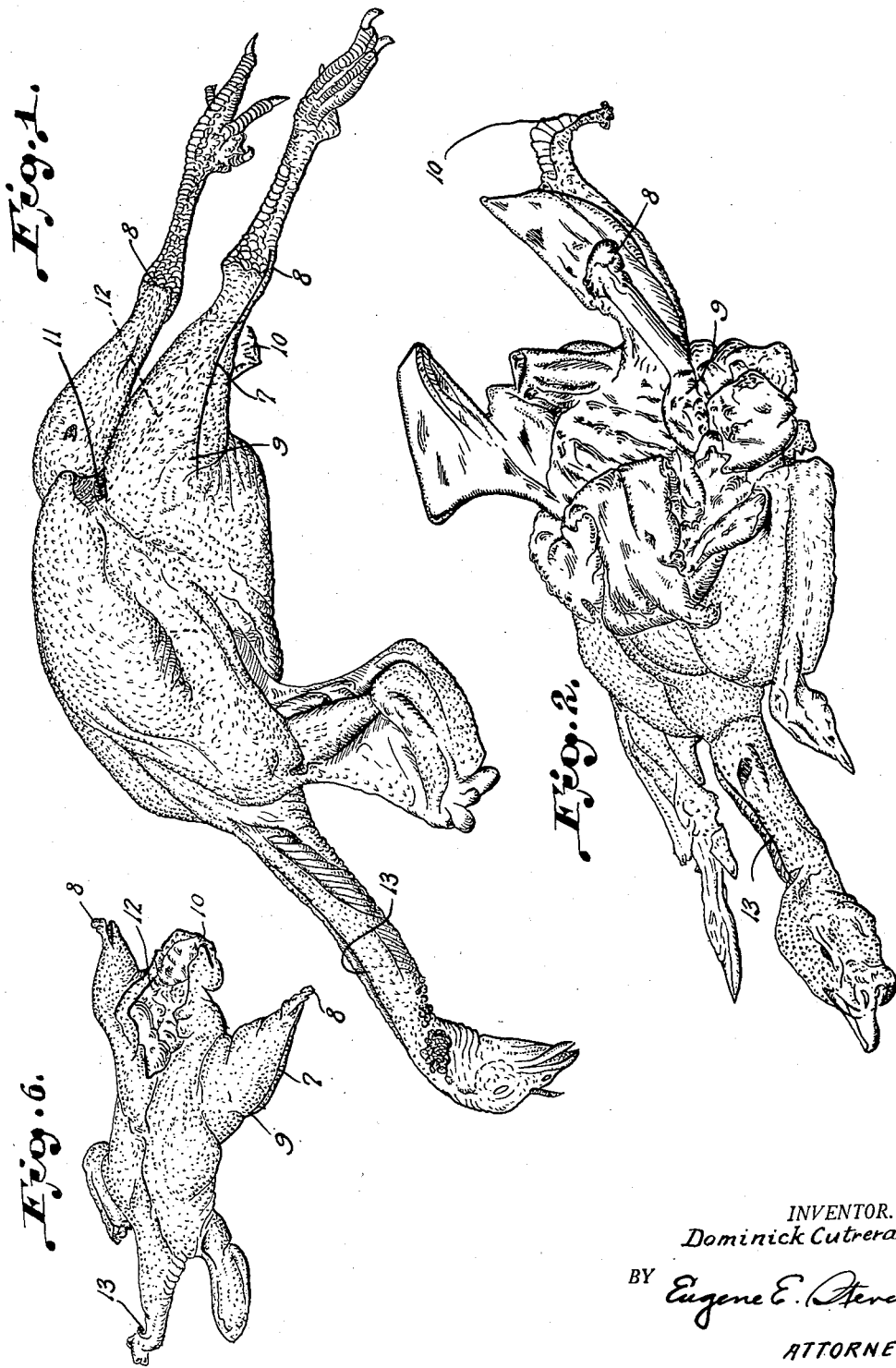
INVENTOR.
Dominick Cutrera
BY Eugene E. Stevens
ATTORNEY.

Oct. 16, 1951 D. CUTRERA 2,571,544
METHOD OF PREPARING BONED TURKEY
Filed Dec. 27, 1949 2 SHEETS—SHEET 2
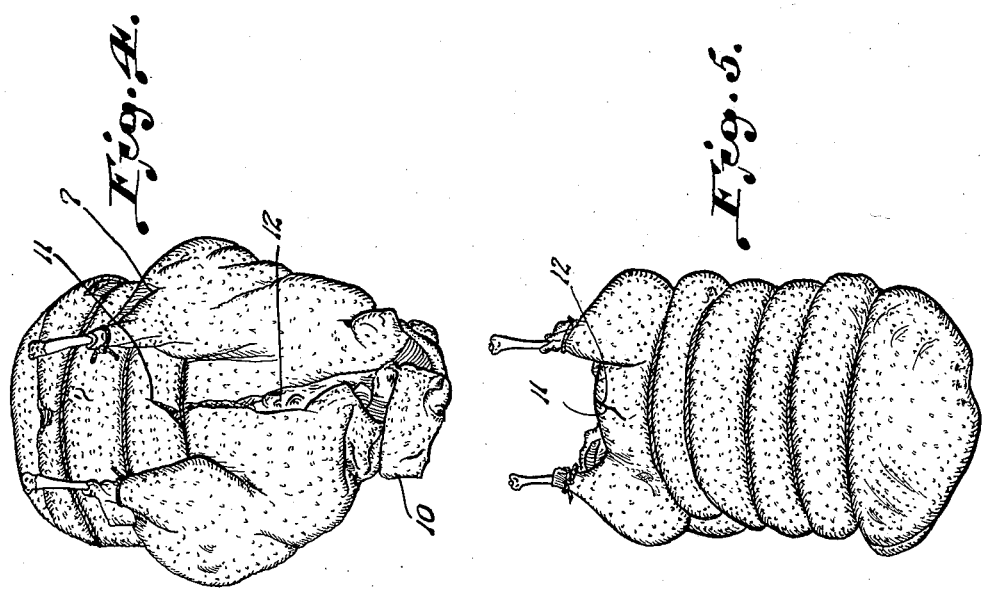
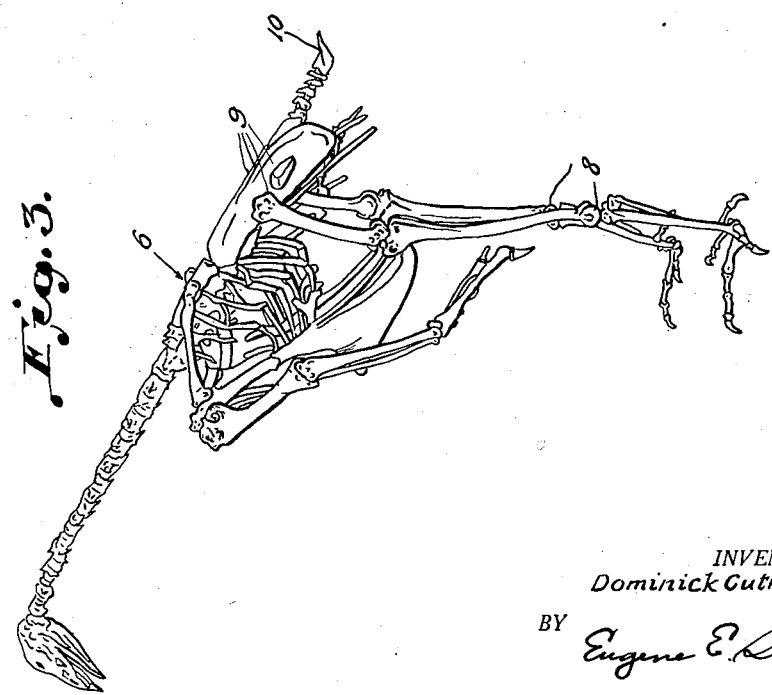
INVENTOR.
Dominick Cutrera
BY
ATTORNEY.

Patented Oct. 16, 1951

2,571,544

UNITED STATES PATENT OFFICE 2,571,544

METHOD OF PREPARING BONED TURKEY

Dominick Cutrera, San Francisco, Calif.

Application December 27, 1949, Serial No. 135,189

4 Claims. (Cl. 17—45)

This invention relates to a method of boning a fowl, that is, a method in which the entire meat and skin portion of the fowl is completely removed from the skeleton of the same, and in one single piece.

The main object of the invention relates to a method for removing the complete carcass of a turkey from its bones or skeleton.

The invention contemplates a method of boning a turkey without any special tools, the same being accomplished by the use of an ordinary and well-known butcher's boning knife. The object is accomplished by making certain incisions at various points in the body of the turkey, after which, by the use of the boning knife, the meat is progressively cut from the bones and skeleton part of the fowl, the meat being turned inside out as it is cut from the bones, and finally removing the same over the head of the fowl, after which the meat and skin is reversed to its original condition, but of course removed from the skeleton, whereupon the meat can be tied as by a plurality of cords to form the same in the fashion of a roast.

The invention is illustrated in the accompanying drawings in which:

Fig. 1 is a perspective view of a turkey before the meat has been removed from the skeleton.

Fig. 2 shows the turkey after a portion of the meat has been removed from the legs and tail part, the meat being shown turned back upon itself.

Fig. 3 is a view showing the skeleton of the turkey after the meat has been entirely removed therefrom.

Fig. 4 is a perspective view looking at the underside of the turkey after the same has been boned, and with ornamental sticks projecting from the boned legs.

Fig. 5 is a perspective view looking at the rear side of the turkey after the same has been boned and formed into a turkey roast, ornamental sticks being inserted into the boned legs as in Fig. 4.

Fig. 6 is a perspective view showing the meat and skin of the turkey after the same has been completely removed from the skeleton and the meat has been reversed back to its original form minus any bone structure.

Referring specifically to the drawings, in which like numerals are used to designate similar parts throughout the various views, and looking at Fig. 3 in particular, the skeleton of a turkey is shown at 6, it of course being understood that the same could be any type fowl. In the method employed, the fowl is first cut at each leg on the outer side thereof by a vertical incision as shown at 7, which extends from a point starting at the knee 8 to a point in the vicinity of the hip bone 9. Thereafter, an incision is made from the tip of the tail 10 along the underside thereof passing between the legs to a point 11 just to the rear of the rearmost breast bone. This incision is shown generally at 12. The skin at a point 13 along the neck and just back of the head is then cut for a purpose to be described later.

After the above referred to incisions are made in the fowl, the operator takes the boning knife and first starts on one of the legs, manipulating the knife to first remove the quizzel in the leg, after which by a cutting and scraping action the meat is severed from the leg bone to a point adjacent the hip bone of the fowl, the meat as it is progressively removed from the leg bone being turned back upon itself to thereby progressively expose the unsevered portion to the operator. Of course, it will be understood that the meat from both legs is removed as described. After the leg portions of the meat has been severed, the next step is to remove the insides from the fowl through the incision 12, it of course being understood that this operation could be performed first or at any time during the boning process. After the fowl has been well cleaned by removal of the innards, and after the meat has been cut from both legs, the next step in the process is to start at the tail and rump portion and scrape this portion of the meat from the rear of the skeleton, of course inverting the meat progressively as the same is being removed. This boning continues along the back and around both sides of the breast to a point at the rear of the wings. When the wings are reached the same procedure is followed until all of the meat has been scraped from each wing, whereupon the operator then continues on, scraping the meat from the neck bone to a point in back of the head to the incision 13. When this point has been reached and with the entire meat and skin turned back upon itself the same is pulled over the head, a circular cut having first been made at the base of the head as suggested in Fig. 3 to detach the neck meat from the neck bone. As will be understood the meat of the fowl has now been removed from the skeleton and is in one piece and without any bones whatsoever.

The boned piece of meat is now manipulated to turn the same inside out, as seen in Fig. 6, to place the same in its original form, that is with the skin of the fowl on the outside. The same is now wrapped with a series of cords to produce in effect a turkey roast which in cross section will comprise a solid, compact mass of meat. It will be thus seen, from the above description, that I have devised a novel method of boning a turkey, the entire skin and meat portion of the fowl being completely removed from the skeleton, the meat only being cut at the places mentioned, that is along each leg, under the rump, and around the neck.

While the method has been disclosed in connection with the boning of a turkey, it will be understood that the same is capable of operation with any type fowl falling within the scope of the following claims.

Having thus described my invention, what I claim is:

1. The method of boning a fowl or the like, comprising forming incisions along each leg above the knee toward the hip joint, forming a second incision from the base of the tail under the rump vent to just back of the rearmost breast bone, removing the entrails through the second incision, cutting the meat from the bones and turning the meat back upon itself as it is cut, continuing to the head of the fowl and forming a third incision just back of the head, removing the meat which is turned inside out over the head to remove the skeleton of the fowl and thereafter turning the meat inside out to its original form.

2. The method of boning a fowl or the like, comprising cutting incisions at the legs, tail and neck, removing the entrails through the tail incision, cutting the meat from the bones and progressively turning the same inside out and finally removing the meat over the head of the fowl, and thereafter turning the meat inside out to its original form.

3. The method of boning a turkey or the like, comprising forming incisions along the outside of each leg, forming an incision from the tail forwardly between the legs to a point adjacent the rear breast bone, severing the skin and meat at the neck and then progressively cutting the meat from the bones and inverting the meat progressively as it is being cut and finally removing the inverted meat and skin over the head and thereafter turning the meat inside out to return it to its normal position but free from the fowl skeleton.

4. The method of boning a fowl comprising forming incisions along the outer leg portions and cutting the same from the tail under the rump to a point in front of the hip bones, then cutting the meat progressively from the bones and starting at each leg portion and turning the meat back upon itself and finally removing the severed meat and skin in a single piece over the head of the fowl.

DOMINICK CUTRERA.

REFERENCES CITED

The following references are of record in the file of this patent:

UNITED STATES PATENTS

| Number | Name | Date |
| --- | --- | --- |
| 1,433,628 | Knaust | Oct. 31, 1922 |
| 2,267,442 | Clark | Dec. 23, 1941 |